United States Patent [19]

Gunn

[11] Patent Number: 4,742,639
[45] Date of Patent: May 10, 1988

[54] FISHING LURE

[76] Inventor: Robert G. Gunn, Rte. 1, Box 237, Etowah, Tenn. 37331

[21] Appl. No.: 113,456

[22] Filed: Oct. 28, 1987

[51] Int. Cl.⁴ ............................................. A01K 85/00
[52] U.S. Cl. .................................. 43/42.13; 43/42.28; 43/42.39
[58] Field of Search ................... 43/42.1, 42.11, 42.13, 43/42.14, 42.15, 42.19, 42.26, 42.28, 42.39

[56] References Cited

U.S. PATENT DOCUMENTS

| | | | |
|---|---|---|---|
| 4,011,681 | 3/1977 | Johnson | 43/42.11 |
| 4,044,491 | 8/1977 | Potter | 43/42.39 |
| 4,133,135 | 1/1979 | Miles | 43/42.13 |
| 4,453,334 | 6/1984 | Opperman | 43/42.13 |
| 4,551,940 | 11/1985 | East | 43/42.13 |
| 4,619,068 | 10/1986 | Wotawa | 43/42.13 |
| 4,625,448 | 12/1986 | Borders | 43/42.13 |
| 4,638,586 | 1/1987 | Hall | 43/42.13 |
| 4,640,041 | 2/1987 | Stanley | 43/42.13 |

Primary Examiner—Kurt Rowan
Attorney, Agent, or Firm—Alan Ruderman

[57] ABSTRACT

A spinner bait fishing lure has a hook carrying weighted body member to which the end of one leg of a substantially V-shaped rigid wire form and one end of a flexible cable are connected. The cable extends through an eyelet at the end of the second leg of the wire form and carries a spinner blade at the end remote from the body member. An additional spinner blade may be mounted intermediate the first spinner blade and the eyelet. A fishing line may be connected at the crotch between the first and second legs of the wire form. The second leg slides relatively to the flexible cable which bends when a tension is applied by the fishing line as the cable flexes.

20 Claims, 1 Drawing Sheet

FISHING LURE

BACKGROUND OF THE INVENTION

This invention relates to a fishing lure of the type known in the art as spinner bait, and more particularly to a fishing lure of this type wherein a flexible cable extending from the hook supporting member carries the spinner remote from the hook, and a rigid wire form also extending from the hook support member has its remote end slidably disposed for movement along the flexible cable, the wire form having the fishing line attached thereto intermediate its ends.

Sport fishing, and especially bass fishing, in recent times has experienced a large degree of popularity. Competitive events such as fishing tournaments with large monetary and other prizes awarded have grown from minor events to large events with an ever increasing number of participants and prizes. Generally prizes are awarded on the basis of the weight and number of fish caught in a given time. Consequently, a fishing lure which can expedite the quantity of the catch is of great significance to the angular.

The prior art abounds with fishing lures of various designs and constructions including those known as spinner bait, a lure which combines a weighted body having a hook and a spinner support wire attached thereto, one or more spinner blades connected to the wire, and a means in the wire, such as an eyelet, for attaching a fishing line. As the lure is pulled through the water by the fishing line the spinner blades rotate randomly. Additional fish attracting members such as a plastic worm or the like, or a plastic or rubber skirt is utilized to hide the hook and provide additional vibrations to the lure. However, the main attraction of a fish to a spinner bait lure is due to the vibration and flashing of the spinner blades.

The spinner bait lures of the prior art have made various attempts to provide increased vibration and flutter to the blades. For example, in Stanley U.S. Pat. No. 4,640,041 the wire extending from the lure weight and carrying the spinner blades has a first diameter extending from the weight to the fishing line attachment location, and a second but smaller diameter wire extending from that location to the spinner blade. This provides increased vibration to the lure. Similar results are claimed by a spinner bait having a flexible cable instead of the smaller diameter wire of Stanley. Another spinner bait lure uses a special blade bar hanger to permit the blades to stand up and rotate freely while falling. In Opperman et al. U.S. Pat. No. 4,453,334, a spinner bait is disclosed wherein the fishing line passes through an eyelet formed in the wire extending from the weight to the spinner blades and is attached to the weight so that the weight and the spinner blade may pivot about the fishing line with the eyelet as a fulcrum which acts to pivot and vibrate the spinner blades in response to tension in the fishing line. In Feltman U.S. Pat. No. 3,750,325 a rigid wire has one arm connected to one spinner while a second arm is connected to a weight which in turn is connected to the hook and another spinner, the weight having fins thereon, the entire combination being claimed to provide rapid vibration.

It can thus be seen that numerous attempts have been made in the prior art to improve the vibration and flutter characteristics of spinner bait lures so as to attract a fish. In all of the known prior art the spinner baits effectively have a V-shaped rigid wire form having one end attached to the weight which carries the hook, and the other end attached to the spinner blades. In the lure of Opperman et al. the crotch of the V-shaped wire includes an eyelet through which the fishing line passes and is attached to the weight. In Feltman a spinner is mounted intermediate the hook and the weight. Parmlee U.S. Pat. No. 2,857,703 shows another arrangement in which a number of spinner blades are used in conjunction with a plurality of hooks, the spinner blades being attached by wires to one limb of a V-shaped weight and the hooks being connected to wires attached to the upper limb of the weight.

It can thus be seen that the fishing art is constantly seeking improvements to the spinner bait lures in the art. Improvements which permit additional vibration and flutter are continuosly sought. Additionally, it is desirable to have the blades mounted so as to stand up and rotate freely while the lure is falling through the water. Another desirable feature of a lure is that of providing it with rapid retrieval capabilities. Because of the configurations of the prior spinner bait lures increased drag has resulted in slower retrieval and greater force is required to pull the lure through the water once a fish has been snagged.

SUMMARY OF THE INVENTION

Consequently, it is a primary object of the present invention to provide a spinner bait fishing lure having improved fish attracting characteristics.

It is another object of the present invention to provide a spinner bait fishing lure having improved vibration and flutter characteristics while permitting the spinner to stand up and rotate freely while falling through the water and which can be retrieved quickly with little drag.

It is a further object of the present invention to provide an artificial spinner bait fishing lure having a flexible cable for carrying the spinners, the flexible cable and one end of a substantially V-shaped rigid wire form being supported by the hook carrying means, and the other end of the wire form being mounted about the flexible cable and slidable relatively thereto.

Accordingly, the present invention provides a spinner bait fishing lure having a hook carrying weighted body member to which the end of one leg of a substantially V-shaped rigid wire form and one end of a flexible cable are connected, the cable passing through an eyelet or the like at the end of the second leg of the wire form and carrying spinner blade means at its end remote from the body member, the wire form having an eye at the junction of the legs for connection to a fishing line. When a force is applied by the fishing line to the bait, the flexible cable bends and the second leg slides along the cable.

In the preferred form of the invention the legs of the rigid wire form a triangle with the flexible cable, the triangle being substantially in the form of an isosceles triangle. The weighted body member preferably carries a rubber skirt to further attract a fish.

As the bait falls the flexible cable permits the spinner blade to stand up and rotate to provoke a fish to strike on the fall. The cable since it is flexible distorts or bends readily when hit by a fish so that the hook is fully exposed. Additionally, the lure when being retrieved has little drag and runs straighter than prior art spinners, and without rolling, since the cable is drawn in either direction through the eye of the second leg of the wire form as determined by the speed of retrieval.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
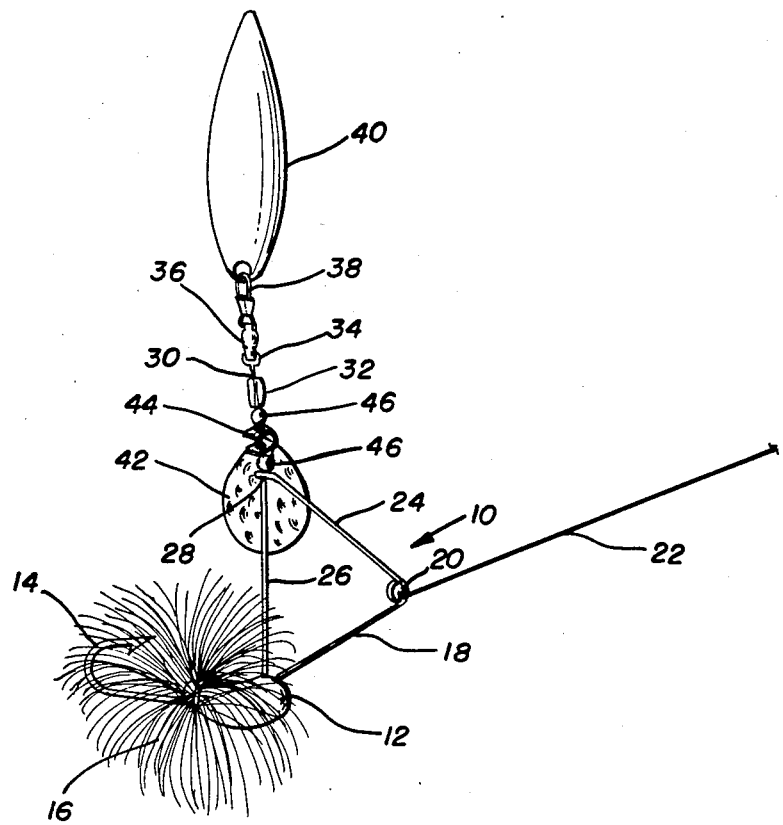
FIG. 1 is a side elevational view of a spinner bait fishing lure constructed in accordance with the present invention as the bait is falling.

Referring now to the drawings, a spinner bait fishing lure generally designated at 10 is illustrated in FIG. 1 substantially in a position as it is dropping and trolled. The lure includes a body member 12 in the form of a weight, which typically is lead painted or otherwise having a finish to emulate natural bait. A hook 14 is carried by the weight 12 extending from one end thereof, and a skirt 16 comprising a multiplicity of rubber filaments or the like is connected to the weight and hides the hook, the filaments having a color which complements to that of the weighted body member 12 as is known in the art.

Molded into the body member remote from the hook 14 is one end of a rigid wire form 16 having two legs, the first leg 18 extending from the weighted body member 12 to a loop 20, preferably coiled so as to form an eyelet for attachment of the fishing line 22, and a second leg 24 extending from the loop 20. Thus, the legs 18 and 24 of the wire form 16 form a substantially V-shaped configuration. Also extending from the weighted body member 12 adjacent the end of the leg 18 is an elongated flexible cable 26, the flexible cable extending away from the weight 12 and through an eyelet 28 formed in the end of the leg 24 remote from the loop 20. The cable 26 extends beyond the loop 28 a short distance, and the end of the cable is bent into the form of a loop 30 and secured thusly by a crimp clamp 32, the loop 30 acting as a connector for another ring 34 which carries a swivel member 36, the swivel being connected to another loop member 38 which is attached to a spinner blade 40. Optionally, another spinner blade 42 may be connected to a clevis member 44 for rotating about the cable 26 between a pair of bearing beads 46, intermediate the loop 28 and the spinner blade 40.

As aforesaid, the cable 26 is a flexible member and may be formed from a nylon cord or line such as that used for grass trimmers, or may be a plurality of twisted rust-resistant wire or plastic filament strands formed into a flexible cord so that the cable may flex and resiliently or yieldably bend and return substantially to its initial configuration and disposition. In a prototype model this cable was seven strand nylon covered wire having a 60 pound test size manufactured by Sevenstrand Tackle Corp. of Huntington Beach, Calif. and sold under the trademark SEVALON. The wire form 16, on the other hand, is a rigid spring wire material such as stainless steel of diameter typically utilized in conventional spinner bait lures. In the prototype model the wire was a single strand stainless steel having a 0.033 inch diameter. Although the leg 24 for practical purposes may be slightly longer than the leg 18 since the leg 24 moves along the cable which bends rearwardly toward the hook and is joined to the weight 12 rearwardly of the junction of the leg 18 therewith, the construction of the lure is such that the legs 24 and 18 are substantially equal. Accordingly, substantially an isoceles triangle is formed by the legs 18, 24 and the cable 26 in the normal condition before the cable bends.

In use when the lure is dropped into the water and the weight 12 pulls it downwardly, the cable supports the spinner blade 40 to stand substantially vertically and rotate, while the optional spinner blade 42 rotates about the cable. Increased vibration and flutter of the lure occurs as the mass moves through the water.

Figure 2:
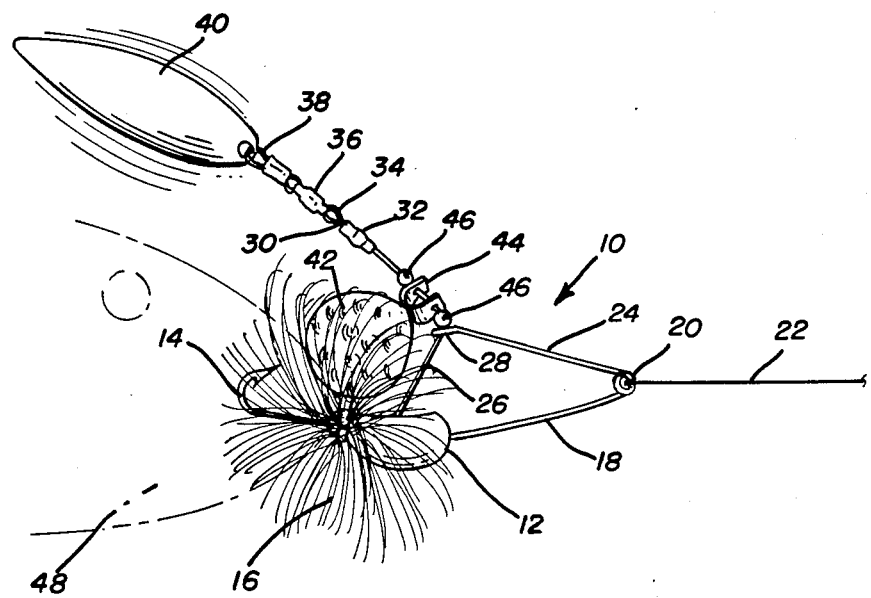
FIG. 2 is a view similar to FIG. 1 illustrating the bait after it has been taken by a fish.

When a fish 48 strikes the lure, the cable bends out of the way to entirely expose the hook 14. When, as illustrated in FIG. 2, after the fish 48 strikes and takes the hook 14, and the line 22 begins to be reeled in, the spinner 40 or spinners 40, 42, which act in opposition to the pull on the line 22, effects a bending of the cable away from the eyelet 20 and the line 22. As this occurs the loop 28 of the wire form leg 24 slides along the cable in the direction toward the body weight 12. This sliding of the leg 24 relative to the cable 26 provides a forward and backward movement of the arm 24 along the cable relative to the body 12 depending upon the retrieval rate, and as the cable bends further and the loop 28 gets closer to the body 12, a more streamlined configuration is presented in the water so that drag is minimized and retrieval is faster. Additionally, rolling resistance is increased and the rolling action of the weight 12 normally occurring on retrieval of prior art spinner baits is minimized.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A fishing lure comprising a body member, a hook carried by said body member, a V-shaped wire form having first and second legs integrally joined at a crotch, the end of said first leg remote from the crotch being connected to said body member remote from said hook, means for forming an eyelet at the end of said second leg remote from the crotch, an elongated flexible cable extending through said eyelet and having one end connected to said body member adjacent said end of said first leg, a spinner blade connected to said cable at the end remote from said body member, and fishing line connecting means at said crotch for attachment of a line thereto, whereby variations in tension exerted on a fishing line attached to said lure effects a flexing of said cable and movement of said second leg along said cable.

2. A fishing lure as recited in claim 1, wherein said first and second legs are substantially equal in length.

3. A fishing lure as recited in claim 1, wherein said first and second legs and said cable intermediate said body member and said eyelet form a triangular configuration when no tension is exerted between said fishing line and said spinner blade.

4. A fishing lure as recited in claim 1, wherein said body member comprises a weight.

5. A fishing lure as recited in claim 4, wherein said hook, said end of said first leg, and said one end of said cable are rigidly fixed to said body member.

6. A fishing lure as recited in claim 5, wherein a skirt comprising a multiplicity of filaments is secured to said body member about said hook.

7. A fishing lure as recited in claim 1, including at least one other spinner blade carried by and rotatable relatively to said cable intermediate said eyelet and said end of said cable remote from said body member.

8. A fishing lure as recited in claim 1, wherein said cable comprises nylon cord.

9. A fishing lure as recited in claim 1, wherein said cable comprises a plurality of twisted strands of yieldable material.

10. A fishing lure as recited in claim 3, wherein said first and second legs are substantially equal in length.

11. A fishing lure as recited in claim 10, including at least one other spinner blade carried by and rotatable relatively to said cable intermediate said eyelet and said end of said cable remote from said body member.

12. A fishing lure as recited in claim 10, wherein said cable comprises nylon cord.

13. A fishing lure as recited in claim 10, wherein said cable comprises a plurality of twisted strands of yieldable material.

14. A fishing lure as recited in claim 10, wherein said body member comprises a weight.

15. A fishing lure as recited in claim 14, wherein said hook, said end of said first leg, and said one end of said cable are rigidly fixed to said body member.

16. A fishing lure as recited in claim 15, wherein a skirt comprising a multiplicity of filaments is secured to said body member about said hook.

17. A fishing lure as recited in claim 16, wherein said cable comprises nylon cord.

18. A fishing lure as recited in claim 16, wherein said cable comprises a plurality of twisted strands of yieldable material.

19. A fishing lure as recited in claim 17, including at least one other spinner blade carried by and rotatable relatively to said cable intermediate said eyelet and said end of said cable remote from said body member.

20. A fishing lure as recited in claim 18, including at least one other spinner blade carried by and rotatable relatively to said cable intermediate said eyelet and said end of said cable remote from said body member.

* * * * *